United States Patent
Popelka et al.

(10) Patent No.: US 9,139,296 B2
(45) Date of Patent: *Sep. 22, 2015

(54) ROTOR HUB VIBRATION ATTENUATOR

(71) Applicant: Textron Innovations Inc., Providence, RI (US)

(72) Inventors: David A. Popelka, Colleyville, TX (US); Frank B. Stamps, Colleyville, TX (US)

(73) Assignee: Textron Innovations Inc., Providence, RI (US)

(*) Notice: Subject to any disclaimer, the term of this patent is extended or adjusted under 35 U.S.C. 154(b) by 254 days.

This patent is subject to a terminal disclaimer.

(21) Appl. No.: 13/933,888

(22) Filed: Jul. 2, 2013

(65) Prior Publication Data

US 2014/0286772 A1 Sep. 25, 2014

Related U.S. Application Data

(63) Continuation of application No. 13/076,581, filed on Mar. 31, 2011, now Pat. No. 8,474,745, which is a continuation-in-part of application No. 12/595,577, filed as application No. PCT/US2007/010109 on Apr. 24, 2007, now Pat. No. 8,424,799.

(51) Int. Cl.
*B64C 27/00* (2006.01)
*B64C 11/00* (2006.01)
*B64C 29/00* (2006.01)

(52) U.S. Cl.
CPC .............. *B64C 27/001* (2013.01); *B64C 11/008* (2013.01); *B64C 29/0033* (2013.01); *B64C 2027/003* (2013.01)

(58) Field of Classification Search
CPC .......................... B64C 27/001; B64C 11/008
USPC ............ 416/144, 145, 500; 244/17.11, 17.27; 74/574.2; 188/379–380
See application file for complete search history.

(56) References Cited

U.S. PATENT DOCUMENTS 2,425,650 A 8/1947 Stalker
3,219,120 A 11/1965 Hooper
(Continued)

FOREIGN PATENT DOCUMENTS

EP 0840191 A1 5/1998
GB 1120193 A 7/1968

OTHER PUBLICATIONS

Extended European Search Report from the European Patent Office in related European patent applicantion No. 07861293, mailed Jan. 13, 2013, 8 pages.
Second Examination Report from Chinese Patent Office in related Chinese patent application No. 200780052754.X, mailed Jan. 23, 2013, 3 pages.
First Office Action from State Intellectual Property Office of the People's Republic of China from related Chinese Patent Application No. 200780052754, dated Jun. 5, 2012.
(Continued)

*Primary Examiner* — Tien Dinh
*Assistant Examiner* — Michael Wang
(74) *Attorney, Agent, or Firm* — James E. Walton; Damon R. Hickman

(57) ABSTRACT

A vibration attenuator for an aircraft has at least one weight mounted in a rotating system of a rotor hub of the aircraft, each weight being rotatable about an axis of rotation of the hub relative to the hub and to each other weight. Drive means are provided for rotating each weight about the axis of rotation at a selected speed for creating oscillatory shear forces that oppose and attenuate rotor-induced vibrations having a selected frequency. A vertically oriented vibration attenuator is configured to oppose and attenuate vertical rotor induced oscillatory forces that would otherwise travel vertical down the rotor mast and into the airframe.

16 Claims, 12 Drawing Sheets

(56) References Cited

U.S. PATENT DOCUMENTS

| | | | |
|---|---|---|---|
| 3,361,216 A * | 1/1968 | Walker | 416/26 |
| 3,617,020 A | 11/1971 | Gerstine | |
| 3,861,828 A * | 1/1975 | Biermann et al. | 416/145 |
| 3,910,720 A | 10/1975 | Vincent et al. | |
| 4,255,084 A | 3/1981 | Mouille et al. | |
| 5,639,214 A | 6/1997 | Guimbal | |
| 6,045,090 A | 4/2000 | Krysinksy et al. | |
| 6,139,271 A | 10/2000 | Chadwick | |
| 8,021,115 B2 * | 9/2011 | Welsh | 416/145 |
| 2005/0079056 A1 | 4/2005 | Welsh | |
| 2006/0083617 A1 | 4/2006 | Jolly et al. | |

OTHER PUBLICATIONS

Office Action in Canadian counterpart Application No. 2,685,025, issued by Canadian Intellectual Property Office, Oct. 3, 2011.

International Patent Examination Report for PCT/US07/10109 dated Jun. 18, 2009.

International Search Report and Written Opinion for PCT/US07/10109 dated Sep. 4, 2008.

* cited by examiner

ROTOR HUB VIBRATION ATTENUATOR

BACKGROUND

1. Field of the Present Description

The technical field is vibration attenuators for rotor hubs.

2. Description of Related Art

Rotary-wing aircraft, such as helicopters and tiltrotors, have at least one rotor for providing lift and propulsion forces, and these rotors have at least two airfoil blades connected to a rotatable hub. The blades cause vibrations that are a function of the rotational speed of the rotor, and aircraft designers have difficulty accurately predicting the exact vibration modes that a particular rotor configuration will encounter. The vibrations can be transmitted through the rotor mast, through associated powertrain components, and into the airframe of the aircraft. The vibrations can reduce the life of affected components and cause undesirable vibrations for passengers. Various types of vibration attenuation systems have been developed to reduce or eliminate these vibrations. The prior art includes airframe-mounted vibration attenuators and at least one mast-mounted system.

Active systems in the prior art act at a specific point on the airframe to reduce vibrations, and this can result in amplified vibrations in other locations on the airframe. However, a passive mast-mounted rotating balancer for vibration reduction was disclosed in U.S. Pat. No. 3,219,120 and in an American Helicopter Society paper entitled, "UREKA-A Vibration Balancing Device for Helicopters" (January 1966, Vol. 11, No. 1). The UREKA (Universal Rotor Excitation Kinematic Absorber) device uses heavy rollers which revolve in a circular steel track to create an oscillatory force to minimize vibration. The rollers are free to rotate and position themselves relative to the position of the rotor, and the rollers will automatically achieve the correct position to minimize vibration if the mast attachment point possesses specific dynamic characteristics. However, the UREKA system only prevents an imbalance of the rotor, and does not oppose other rotor-induced vibrations. The dynamic characteristics necessary for proper operation are basically those of a supercritical shaft. If the mast attachment point does not possess these characteristics, then the UREKA device will amplify vibration rather that attenuate it. In addition, since the position of the rollers is governed by the motion of the mast attachment point, the device is susceptible to gusts and other transients which may disturb the roller position, creating a vibration transient.

For application to tiltrotors, where large changes in gross weight and rotor rotational speed are present, the UREKA device may not function properly, as the dynamic characteristics of the mast attachment point would vary considerably. The V-22 tiltrotor, for example, has dynamic characteristics which prevent the use of the UREKA design. One method developed for the 3-blade V-22 aircraft includes passive pendulums for controlling vibrations.

Although great strides have been made in the art of vibration attenuators for rotor hubs, significant shortcomings remain.

BRIEF DESCRIPTION OF THE DRAWINGS

The novel features believed characteristic of the present system are set forth in the appended claims. However, the system itself, as well as a preferred mode of use, and further objectives and advantages thereof, will best be understood by reference to the following detailed description when read in conjunction with the accompanying drawings, wherein:

DETAILED DESCRIPTION

A vibration attenuator system for a rotor hub provides for vibration attenuation in a rotary-wing aircraft by reducing the magnitude of rotor induced vibratory forces acting on the airframe. The vibration attenuator system includes vibration attenuators attached to a rotor mast in the rotating system of the rotor hub for rotation about the mast axis in the same or opposite direction as the mast. Vibratory shear force is generated by rotating pairs of unbalanced weights at high speed to create large centrifugal forces, and the weights may be driven by electric motors or by torque provided by the mast. The rotational speed of the weights will typically be a multiple of the mast rotational speed to create shear forces for canceling rotor induced vibrations, which can be rotating in the same direction as the proprotor or in the opposite direction. The amplitude of the shear force is controlled by indexing the positions of the weights of each pair relative to each other as they rotate about the axis of the mast, while the phase of the shear force is adjusted by equally phasing each pair of weights relative to the rotor. A microprocessor-based control system uses feedback from vibration sensors to command the operation of the vibration attenuators so as to minimize vibrations transmitted to the airframe.

This system is an improvement over methods now being used because it is lighter weight, more compact, and is capable of better vibration reduction. The principal advantage of this device is that it cancels the source of vibratory loads, thereby reducing vibration throughout the entire aircraft. As described above, competing active systems act to reduce vibrations at a specific point in the airframe, which can cause amplified vibrations at other locations in the airframe. By reducing the magnitude of rotor-induced vibratory loads, the vibration attenuator system can improve the fatigue life of critical structural components, reduce vibration of avionics, reduce engine vibration, and improve passenger comfort.

Figure 1:
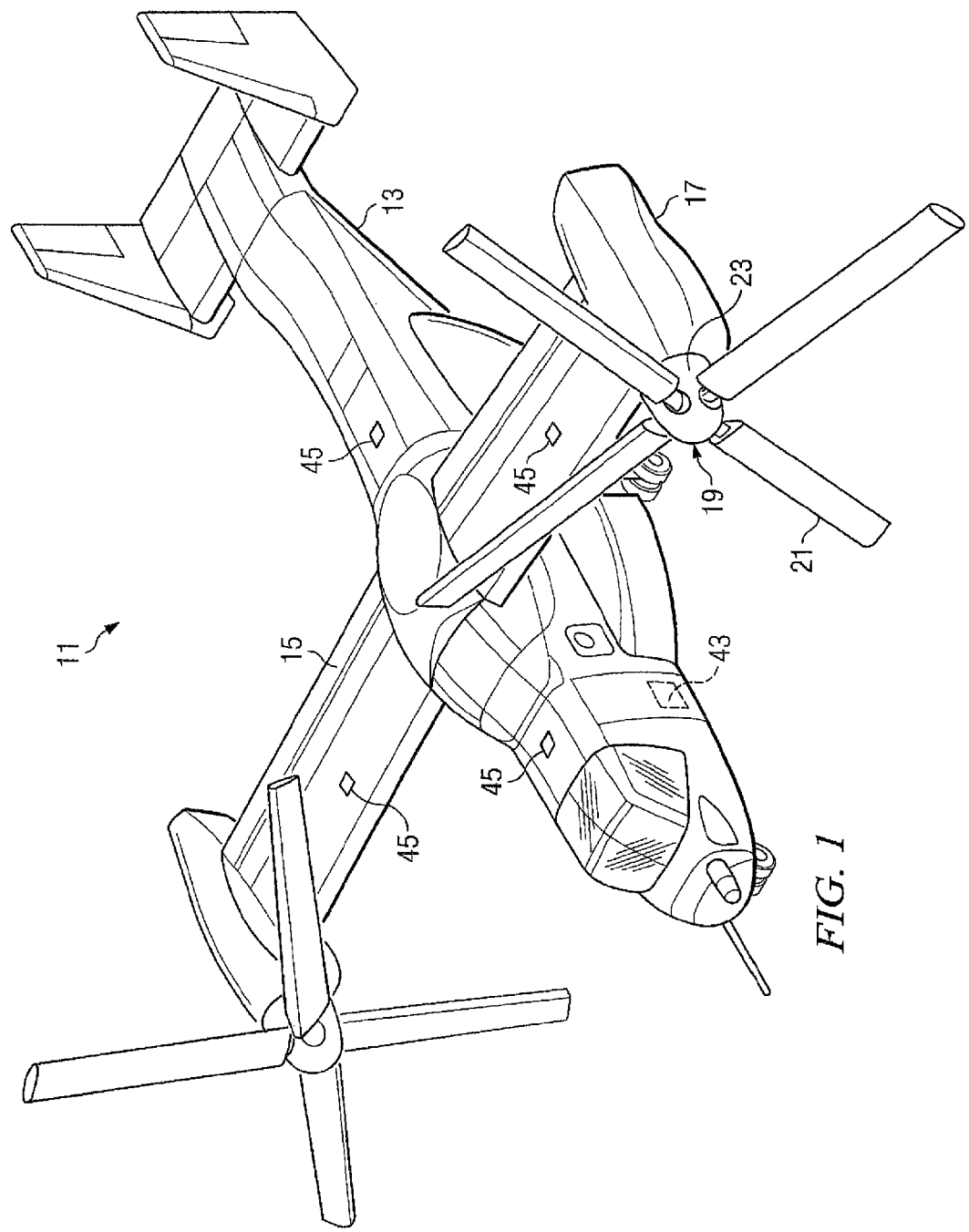
FIG. 1 is an oblique view of an aircraft having a vibration attenuation system.

FIG. 1 is an oblique view of a rotary-wing aircraft having a vibration attenuator system, which is described below. Aircraft 11 is a rotary-wing aircraft, specifically a tiltrotor aircraft, having a fuselage 13 and wings 15 extending from fuselage 13. Fuselage 13 and wings 15 comprise the airframe of aircraft 11. A rotatable nacelle 17 is located at the outer end of each wing 15 for housing an engine (not shown), and each engine is configured for providing torque to cause rotation of an attached proprotor 19. Each proprotor 19 has a plurality of blades 21, which are connected to a hub (see FIG. 2) located beneath an aerodynamic fairing, referred to as a spinner 23.

Figure 2:
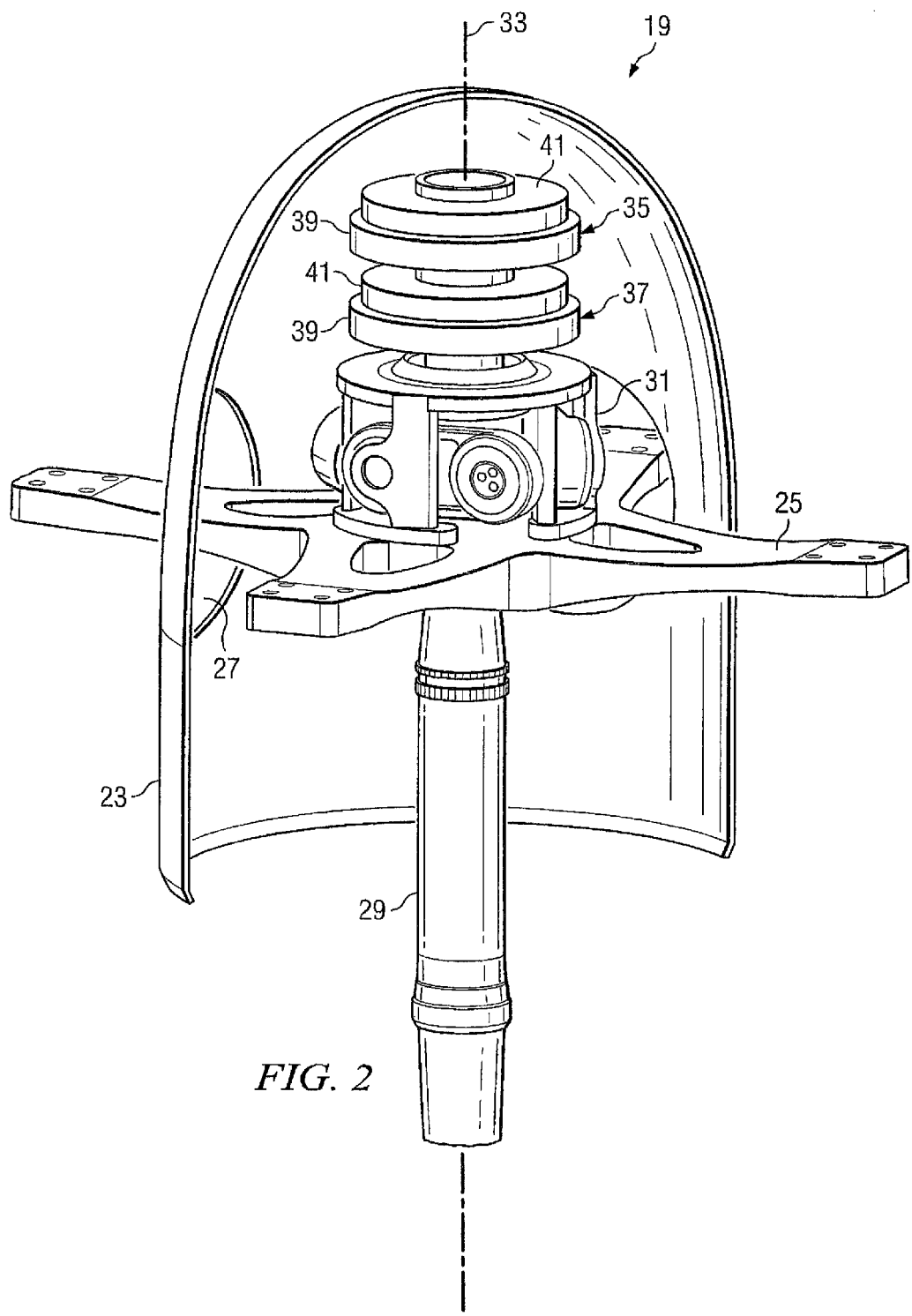
FIG. 2 is an oblique, partially sectioned view of a proprotor of the aircraft of FIG. 1.

FIG. 2 is an oblique view of a proprotor 19 with blades 21 removed from yoke 25 of the hub. Holes 27 are formed in spinner 23 (a portion is cutaway for ease of viewing) for allowing portions of yoke 25 to protrude for attachment of blades 21. A mast 29 is connected to an output of the engine for transfer of torque from the engine to mast 29. In the configuration shown, a constant-velocity drive assembly 31 is splined to mast 29 for rotation with mast 29, and yoke 25 is connected to drive assembly 31. Drive assembly 31 allows for yoke 25 to gimbal relative to mast 29 as mast 29 drives yoke 25 in rotation about mast axis 33.

In the configuration shown, two vibration attenuators 35, 37 are carried on an end portion of mast 29. Attenuators 35, 37 operate in a substantially identical manner and have similar construction, with each having a rotatable weight, such as weighted disk 39, and an electric motor 41. Motors 41 are splined or otherwise affixed to mast 29 for rotation with mast 29, and each motor 41 is preferably a brushless stepper motor configured for driving the associated disk 39 in rotation about mast axis 33 in a selected direction and at a selected rotational speed relative to mast 29. Each disk 39 has a center of mass that is located a radial distance from mast axis 33, such that rotation of each disk 39 causes an oscillatory, radially outward shear force on mast 29 in the plane of rotation. While shown as having a disk-shaped construction, weights of attenuators 35, 37 may be of other types, such as elongated arms. By using a stepper-type motor 41, each disk 39 can be rotated to a selected angle, or indexed, relative to the other disk 39 during their rotation at the same speed and direction about mast axis 33. In addition, disks 39 may be commanded to rotate together at the same speed and direction and at a selected phasing relative to proprotor 19 while maintaining the same index setting.

Referring also to FIG. 1, a microprocessor-based control system 43 is shown as being located in fuselage 13 and is configured to automatically control the operation of vibration attenuators 35, 37. Control system 43 preferably comprises feedback sensors, such as sensors 45 located on fuselage 13 and wings 15, to provide vibration feedback data. Though shown in particular locations, sensors 45 may be installed in other locations, such as within nacelles 17. Use of sensors 45 allows control system 43 to control the operation of vibration attenuators 35, 37 based on measurements of vibrations transmitted into and through the airframe. Control system 43 may alternatively control operation of vibration attenuators 35, 37 based on other data, such as airspeed, rotor speed, blade pitch angle, nacelle angle, amount of rotor thrust, and/or similar parameters.

Operational control preferably includes commanding at least rotational speed, rotational direction, indexing of pairs of disks 39, and phasing of pairs of disks 39. Control system 43 and/or vibration attenuators 35, 37 may be provided with "fail-off" features to prevent vibration attenuators 35, 37 from inducing unintended and undesirable vibrations in the event of failure of one or more components of the vibration attenuation system. Inputs to control system may include aircraft gross weight, load factor, altitude, airspeed, and rpm. In addition, control system 43 may be optimized for use on tiltrotor aircraft 11 by also basing commands on the angle of nacelles 17 and other tiltrotor-specific parameters. Use of control system 43 to control vibration attenuators 35, 37 means that attenuators 35, 37 are less susceptible to transients, such as gusts, than the prior-art UREKA system and is not dependant on the dynamic characteristics of the mast.

In operation, control system 43 independently commands each motor 41 to drive associated disk 39 in the selected rotational direction and at the selected rotational speed. For example, disks 39 may be driven in the same rotational direction as mast 29 and at a multiple of the rotational speed of mast 29. Disks 39 are unbalanced, and they create oscillatory shear forces in the plane of rotation at a frequency described as the number of cycles per revolution of proprotor 19 (n/rev). When the shear forces are equal in amplitude to the aerodynamic n/rev forces of proprotor 19 and opposite their phase, then no vibratory force will be transmitted to the airframe. For example, if a four-blade proprotor 19 is rotating at 400 revolutions per minute, and the vibration attenuators are to oppose 4/rev vibrations by rotating in the direction of proprotor 19, motors 41 will cause disks 39 to spin at 4× the speed of proprotor 19 relative to the airframe. Because mast 29 is spinning in the same direction as disks 39 relative to the airframe at 1× the speed of proprotor 19, disks 39 will be spinning at 3× the speed of proprotor 19 relative to mast 29 and proprotor 19. Likewise, if disks 39 are to oppose 8/rev vibrations by rotating in the opposite rotation of proprotor 19, motors 41 will cause disks 39 to spin at 8× the speed of proprotor 19 relative to the airframe. Because mast 29 is spinning in the opposite direction at 1× the speed of proprotor 19, the disks will be spinning at 9× the speed of proprotor 19 relative to mast 29 and proprotor 19.

The magnitude of the oscillatory shear force is determined by the relative position of the center of mass of disks 39. FIGS. 3A and 3B, 4A and 4B, and 5A and 5B illustrate the relative rotational positions of disks 39 of vibration attenuators 35, 37 for three modes of operation, with each A and B figure showing one of disks 39 as viewed along mast axis 33. In each figure, the direction of rotation of mast 29 is shown by arrow 47, and the direction of rotation of disk 39 is shown by arrow 49.

As described above, each disk 39 has a center of mass located a radial distance from mast axis 33, and this may be accomplished, for example, by locating a mass 51 along a peripheral portion of each disk 39. Mass 51 may be formed as an integral portion of disk 39 or may be formed as a separate component and attached to disk 39. To provide for additional tuning of attenuators 35, 37, each mass 51 may be configured to be replaceable, for example, by a similarly constructed mass 51 having more or less mass. Mass 51 may also be constructed of multiple pieces, allowing mass 51 to be adjusted by removing or adding pieces. Though shown as having only one mass 51, it should be understood that disks 39 may configured to have more than mass 51.

Figure 3A:
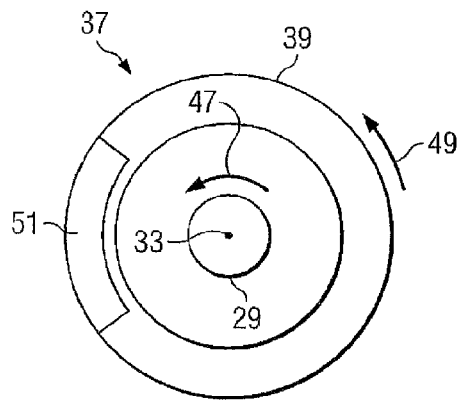
FIG. 3A is a schematic view of a portion of the vibration attenuation system of the aircraft of FIG. 1.
Figure 3B:
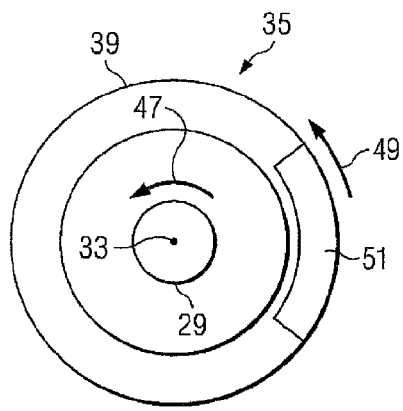
FIG. 3B is a schematic view of a portion of the vibration attenuation system of the aircraft of FIG. 1.
Figure 4A:
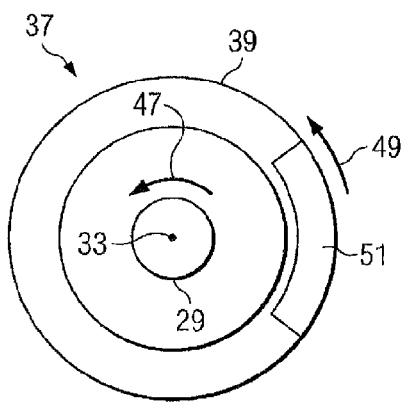
FIG. 4A is a schematic view of a portion of the vibration attenuation system of the aircraft of FIG. 1.
Figure 4B:
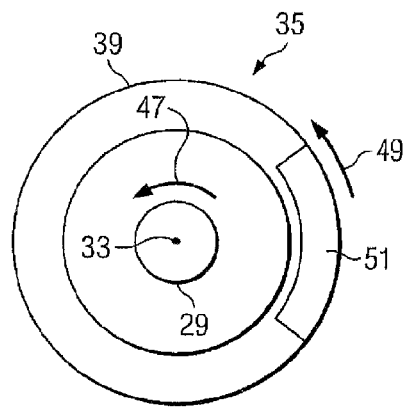
FIG. 4B is a schematic view of a portion of the vibration attenuation system of the aircraft of FIG. 1.
Figure 5A:
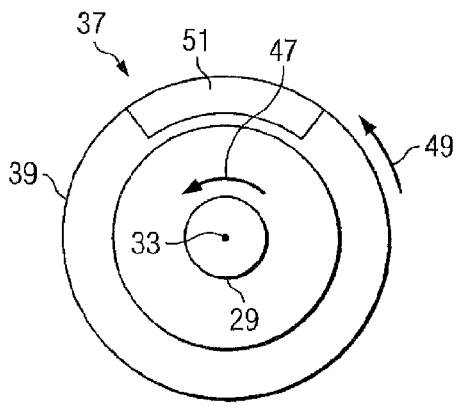
FIG. 5A is a schematic view of a portion of the vibration attenuation system of the aircraft of FIG. 1.
Figure 5B:
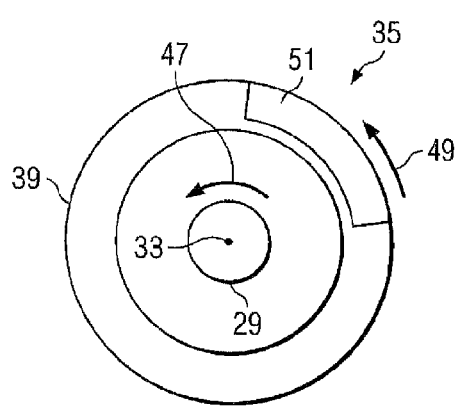
FIG. 5B is a schematic view of a portion of the vibration attenuation system of the aircraft of FIG. 1.

If masses 51 of vibration attenuators 35, 37 are diametrically opposed, as shown in FIGS. 3A and 3B, while disks 39 are driven in rotation at the same speed, then the amplitude of the vibratory force will be zero. This is due to the fact that each disk 39 causes an equal and opposite shear force that cancels the force caused by the other of disks 39. If disks 39 are indexed during rotation so that masses 51 are aligned, as shown in FIGS. 4A and 4B, the shear force is the maximum magnitude that vibration attenuators 35, 37 can produce for any given rotational speed. Any magnitude between zero and the maximum is available by changing the relative angle of disks 39, and FIGS. 5A and 5B show disks 39 as having been indexed relative to each other at an angle of approximately 45 degrees.

Proprotor 19 is described as having only one pair of vibration attenuators 35, 37, though additional pairs of attenuators may be added to oppose additional vibration modes (8/rev, 12/rev, etc.). Additional attenuators are added in a coaxial arrangement along mast axis 33, and each pair may comprise weights having a different weight than disks 39 and operating at a selected rotational speed different than disks 39. It should be noted that the attenuators will be different for different types of rotors, as the weights will be optimized for the particular application.

Figure 6:
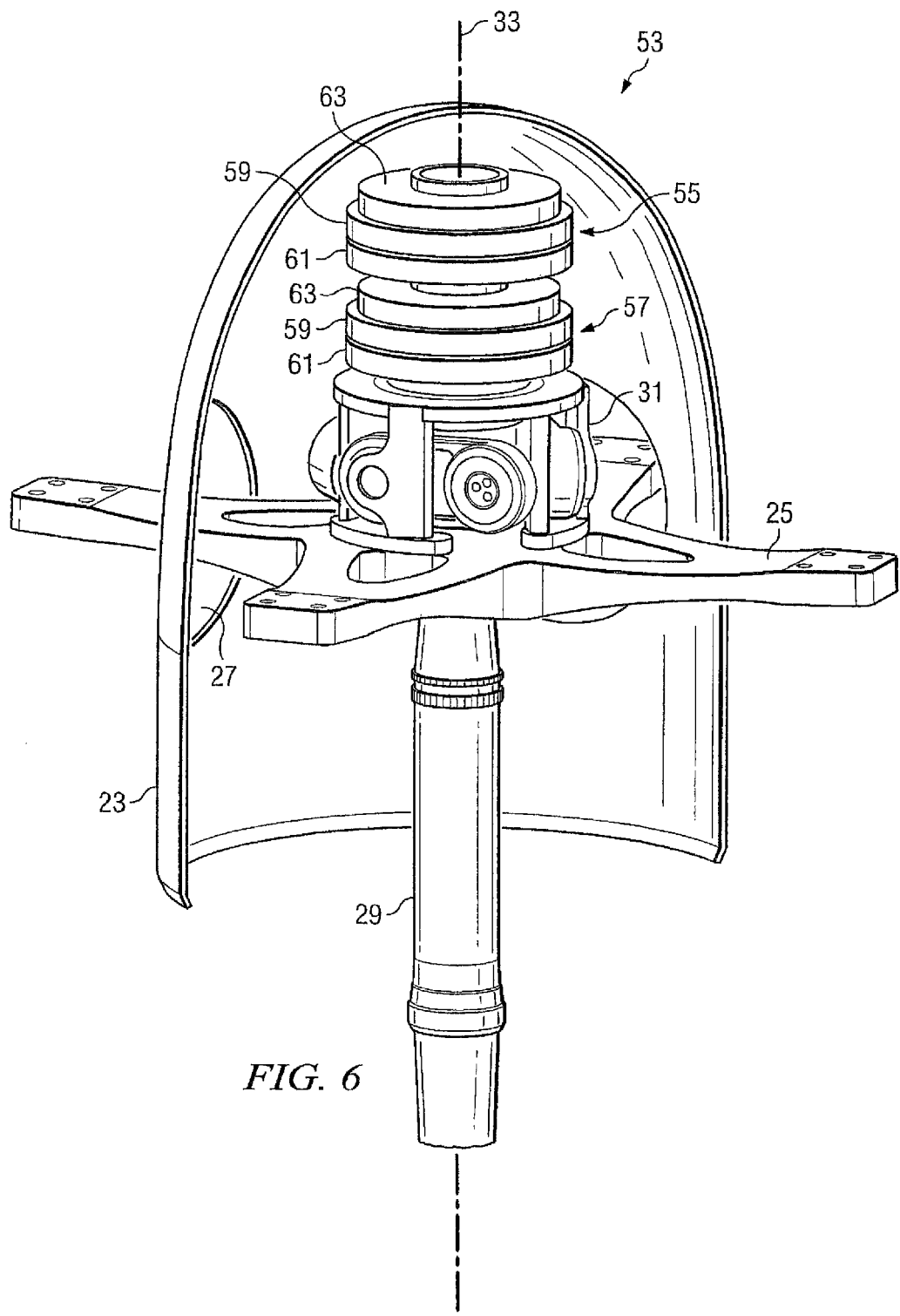
FIG. 6 is an oblique, partially sectioned view of a proprotor having an alternative embodiment of a vibration attenuation system.

FIG. 6 illustrates a portion of an alternative embodiment of a proprotor 53, which is constructed similarly to proprotor 19 of FIGS. 1 and 2. Proprotor 53 has a yoke 25 attached to a drive assembly 31, and drive assembly 31 transfers torque from mast 29 to yoke 25. A spinner 23 (a portion is cutaway for ease of viewing) is installed as an aerodynamic fairing for the hub of proprotor 53. Proprotor 53 differs from proprotor 19, in that proprotor 53 has two vibration attenuators 55, 57, which are coaxially arranged on mast axis 33. Each attenuator 55, 57 has a pair of weighted disks 59, 61 and a pair of stepper motors 63 (only one of each attenuator 55, 57 being visible in the view of FIG. 6). Each attenuator 55, 57 rotates the associated disks 59, 61 in the same direction and at the same rotational speed, though disks 59, 61 of the other attenuator 55, 57 preferably rotate at a different speed and may rotate in a different direction. A control system, such as control system 43 of FIG. 1, is preferably provided for controlling the operation of both pairs of disks 59, 61, including indexing and phasing of the disks in each pair, as described above for disks 39, 41. In operation, having two attenuators 55, 57 allows for both attenuators 55, 57 to suppress vibrations simultaneously. Also, having two attenuators 55, 57 allows for only one attenuator 55, 57 to suppress a selected vibration while the other attenuator 55, 57 is indexed to produce no net shear force.

Figure 7:
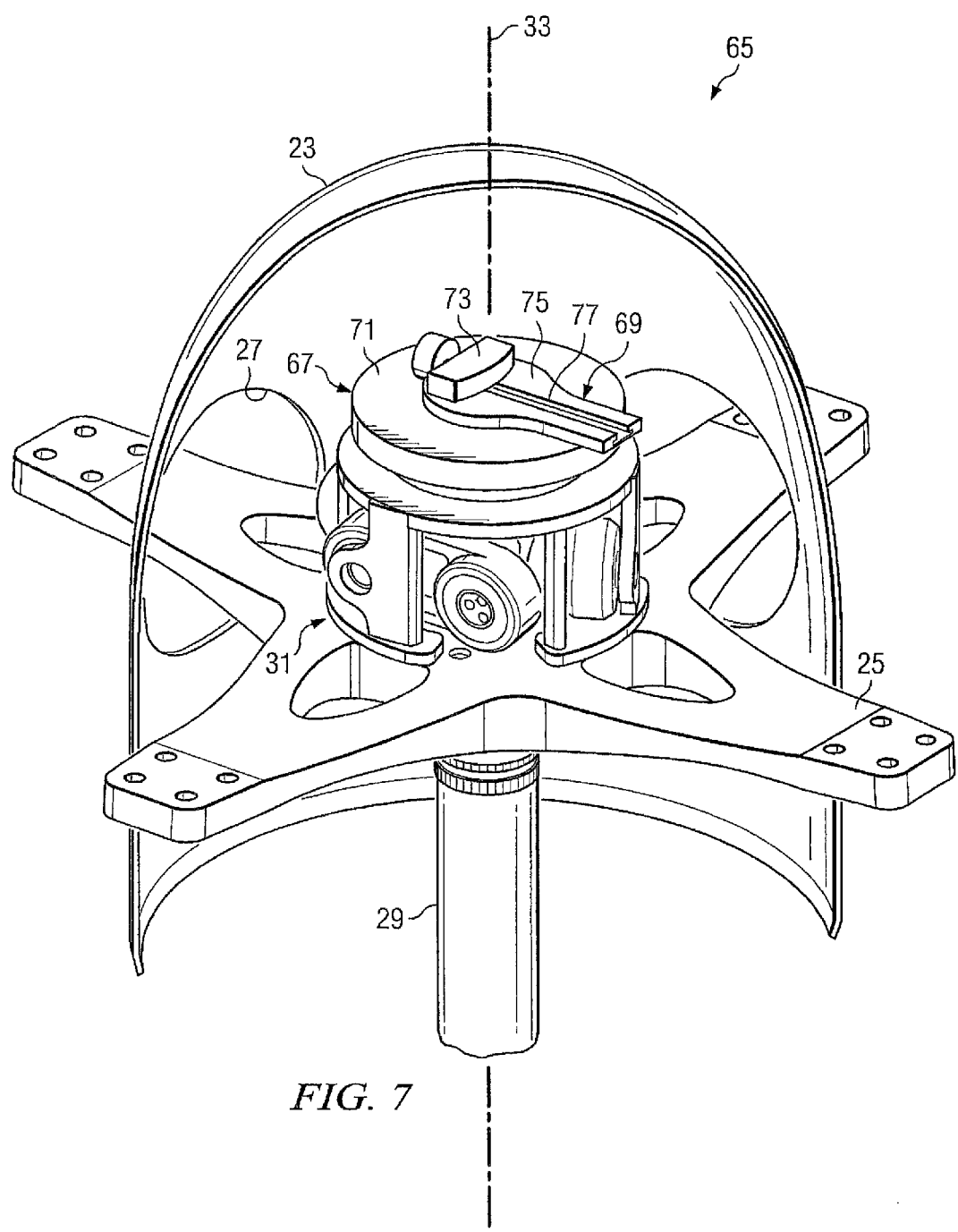
FIG. 7 is an oblique, partially sectioned view of a proprotor having an alternative embodiment of a vibration attenuation system.
Figure 8:
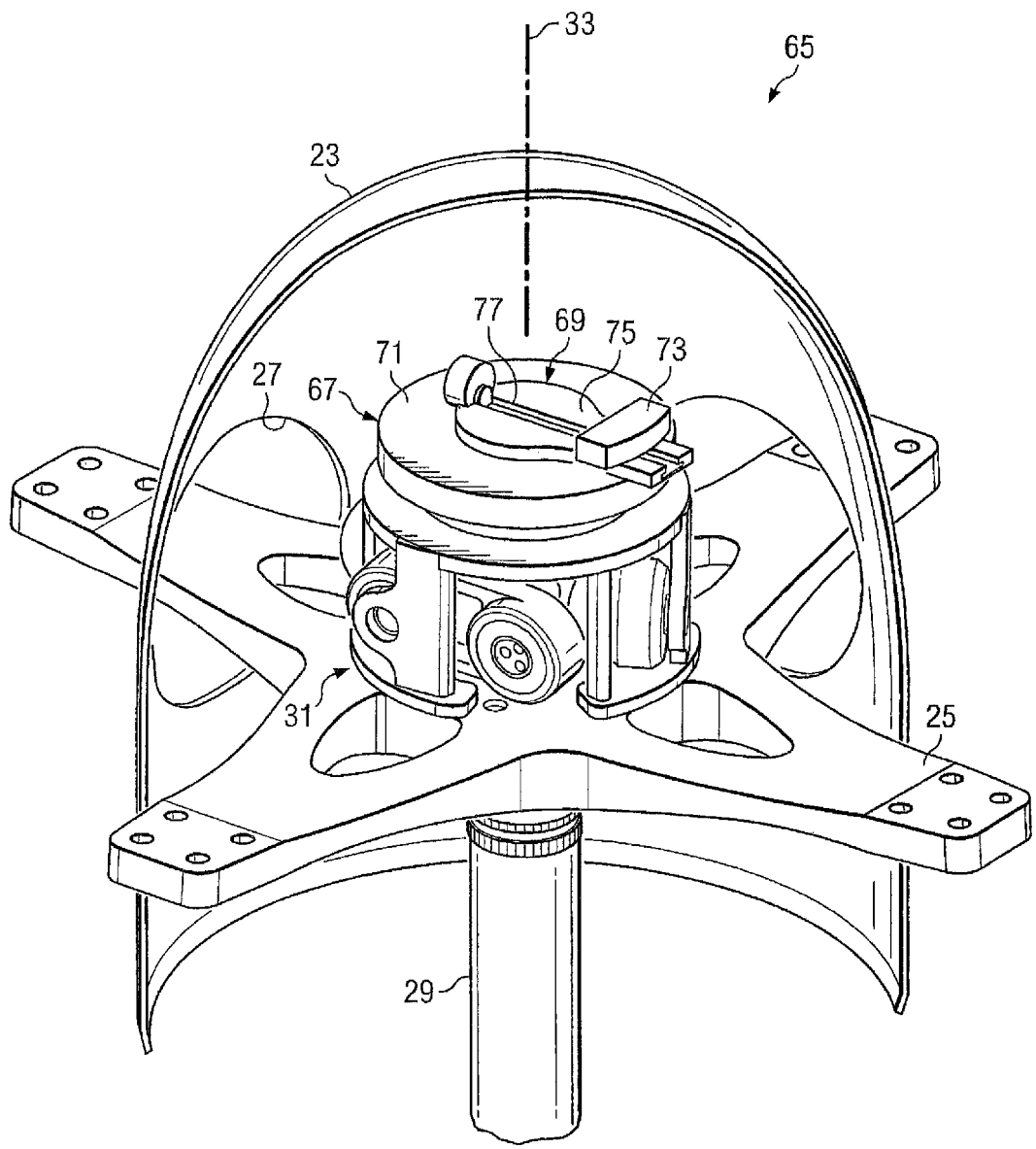
FIG. 8 is an oblique, partially sectioned view of the proprotor of FIG. 7.

FIGS. 7 and 8 illustrate a portion of an alternative embodiment of a proprotor 65, which is constructed similarly to proprotor 19 of FIGS. 1 and 2. Proprotor 65 has a yoke 25 attached to a drive assembly 31, and drive assembly 31 transfers torque from mast 29 to yoke 25 for rotation of proprotor 65 about mast axis 33. A spinner 23 (a portion is cutaway for ease of viewing) is installed as an aerodynamic fairing for the hub of proprotor 65. Proprotor 65 has a vibration attenuator 67, comprising an adjustable weight assembly 69, which is configured to be driven in rotation relative to mast 29 and about mast axis 33 by stepper motor 71. Weight assembly 69 has at least one weight 73 that is movably attached to weight support 75 for positioning along track 77 during operation of proprotor 65. This configuration allows for weight 73 to be selectively moved to any position between an inner radial position, which provides for minimal or no shear forces as weight assembly 69 spins, and an outer position, which provides for maximum shear forces. FIG. 7 shows proprotor 65 with weight 73 having been moved to an inner position, and FIG. 8 shows proprotor 65 with weight 73 having been moved to an intermediate position. A control system, such as control system 43 of FIG. 1, is preferably provided for controlling the parameters of operation of vibration attenuator 67, including positioning of weight 73, speed of rotation, direction of rotation, and phasing of the shear forces relative to the position of the rotor.

In operation, control system 43 commands motor 71 of vibration attenuator 67 to rotate weight assembly 69 at a selected rotational speed and direction relative to mast 29, and control system 43 also commands weight 73 to move to a selected position along track 77 for producing a selected amount of shear force. In addition, control system 43 will command motor 71 to rotate weight assembly 69 in a manner that produces a selected phasing of the shear forces relative to proprotor 65.

Figure 9:
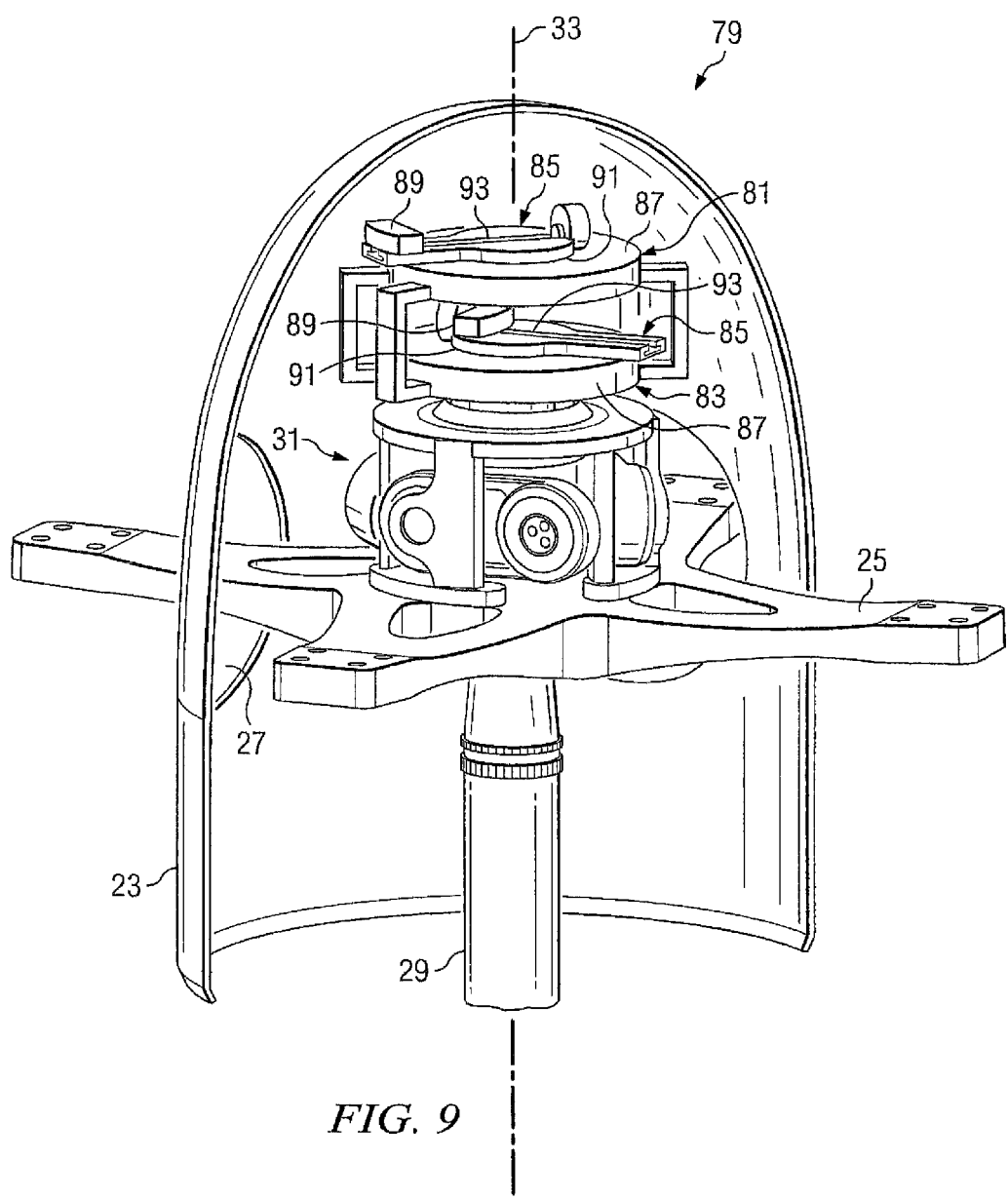
FIG. 9 is an oblique, partially sectioned view of a proprotor having an alternative embodiment of a vibration attenuation system.
Figure 10:
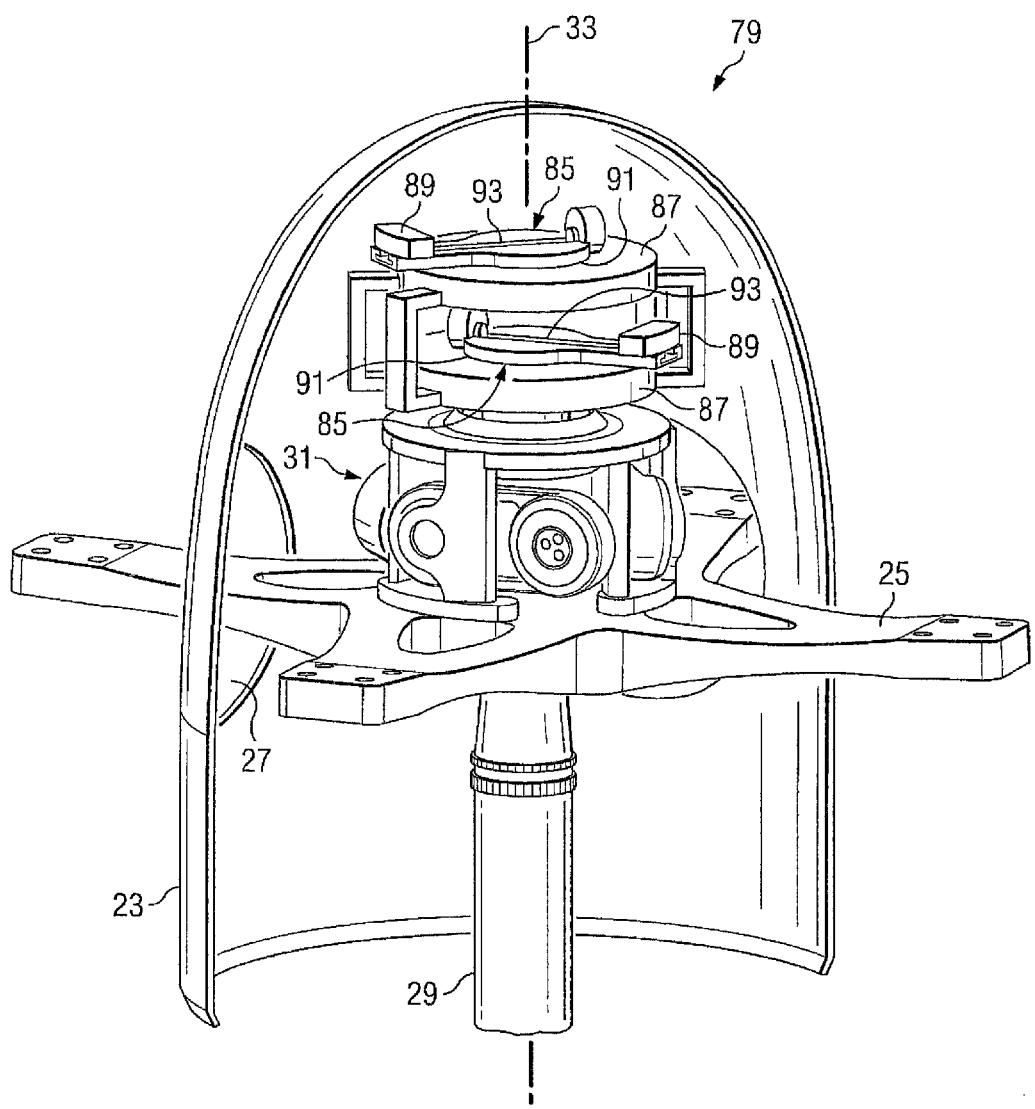
FIG. 10 is an oblique, partially sectioned view of the proprotor of FIG. 9.

FIGS. 9 and 10 illustrate a portion of an alternative embodiment of a proprotor 79, which is constructed similarly to proprotor 65 of FIGS. 7 and 8. Proprotor 79 has a yoke 25 attached to a drive assembly 31, and drive assembly 31 transfers torque from mast 29 to yoke 25. A spinner 23 (a portion is cutaway for ease of viewing) is installed as an aerodynamic fairing for the hub of proprotor 79. Proprotor 79 differs from proprotor 65, in that proprotor 79 has two vibration attenuators 81, 83, which are coaxially arranged on mast axis 33. Each attenuator 81, 83 has a rotatable weight assembly 85 and a stepper motor 87, and each weight assembly 85 comprises at least one weight 89 movably attached to weight support 91 for selective positioning along track 93 during operation of proprotor 79. Motor 87 of each attenuator 81, 83 rotates the associated weight assembly 85 at a selected rotational speed and direction, and weight assemblies 85 may rotate in the same or opposite directions and at similar or varying speeds. A control system, such as control system 43 of FIG. 1, is preferably provided for controlling the operation of both vibration attenuators 81, 83, including phasing of weight assemblies 85 relative to proprotor 79. FIG. 9 shows proprotor 79 with weight 89 of attenuator assembly 81 having been moved to an outer position, whereas weight 89 of attenuator 83 is shown having been moved to an inner position. FIG. 10 shows both weights 89 having been moved to outer positions.

Vibration attenuators 81, 83 are shown as having weights adjustable for distance from axis 33, allowing for each attenuator 81, 83 to be used for attenuating a specific vibration. However, another embodiment of a proprotor includes the use of similar attenuators, in which each weight is positioned or formed on an elongated weight support in a selected fixed position. This type of configuration requires the use of two attenuators to attenuate a specific vibration, and they are controlled in a manner like that for vibration attenuators 35, 37.

Other embodiments of the vibration attenuators described above may include a gear-type drive system for driving the weights in rotation rather than using electric motors. This type of attenuator would operate without requiring a large external source of power, as the power required for operation is preferably taken from the mast. A small electric current may be used for electric motors to position the indexed weights about the mast axis for phasing, but once phased, the parasitic power requirement is negligible and is derived from the mast torque.

Figure 11:
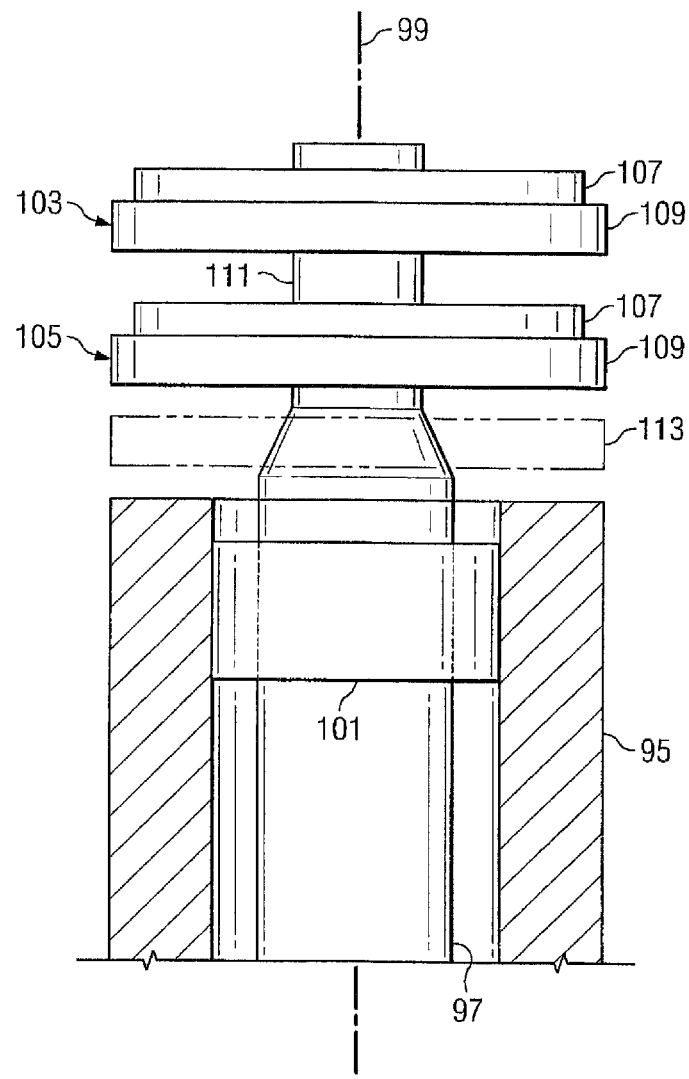
FIG. 11 is a side, partially sectioned view of a proprotor having an alternative embodiment of a vibration attenuation system.

Another feature that may be incorporated in the vibration attenuators described above is a "standpipe" configuration for mounting of the attenuators. FIG. 11 shows an example embodiment, in which a mast 95 encloses a coaxial standpipe 97. In FIG. 11, mast 95 is show with a portion removed for ease of viewing standpipe 97. Mast 95 rotates relative to the airframe (not shown) about axis 99 for rotating an attached proprotor (not shown). Standpipe 97 is stationary relative to the airframe, and bearings 101 are located between an outer surface of standpipe 97 and an inner surface of mast 95 to allow for the relative motion of mast 95 relative to standpipe 97. In the embodiment shown, two attenuators 103, 105 each comprise a motor 107 and a weighted disk 109. Attenuators 103, 105 are mounted to a narrowed section 111 at an outer end of standpipe 97. An optional platform 113 may be provided on standpipe 97 for mounting attenuators 103, 105 or other embodiments of the attenuators described above. In operation, motors 107 rotate disks 109 attenuators 103, 105 in a similar manned as those described above, allowing attenuators 103, 105 to produce oscillatory shear forces on standpipe 97. These shear forces are then transferred into mast 95 through bearings 101. It should be noted that more or fewer attenuators than is shown may be mounted on standpipe 97. It should also be noted that a standpipe configuration is particularly useful with the gear-type drive system described above.

Figure 12:
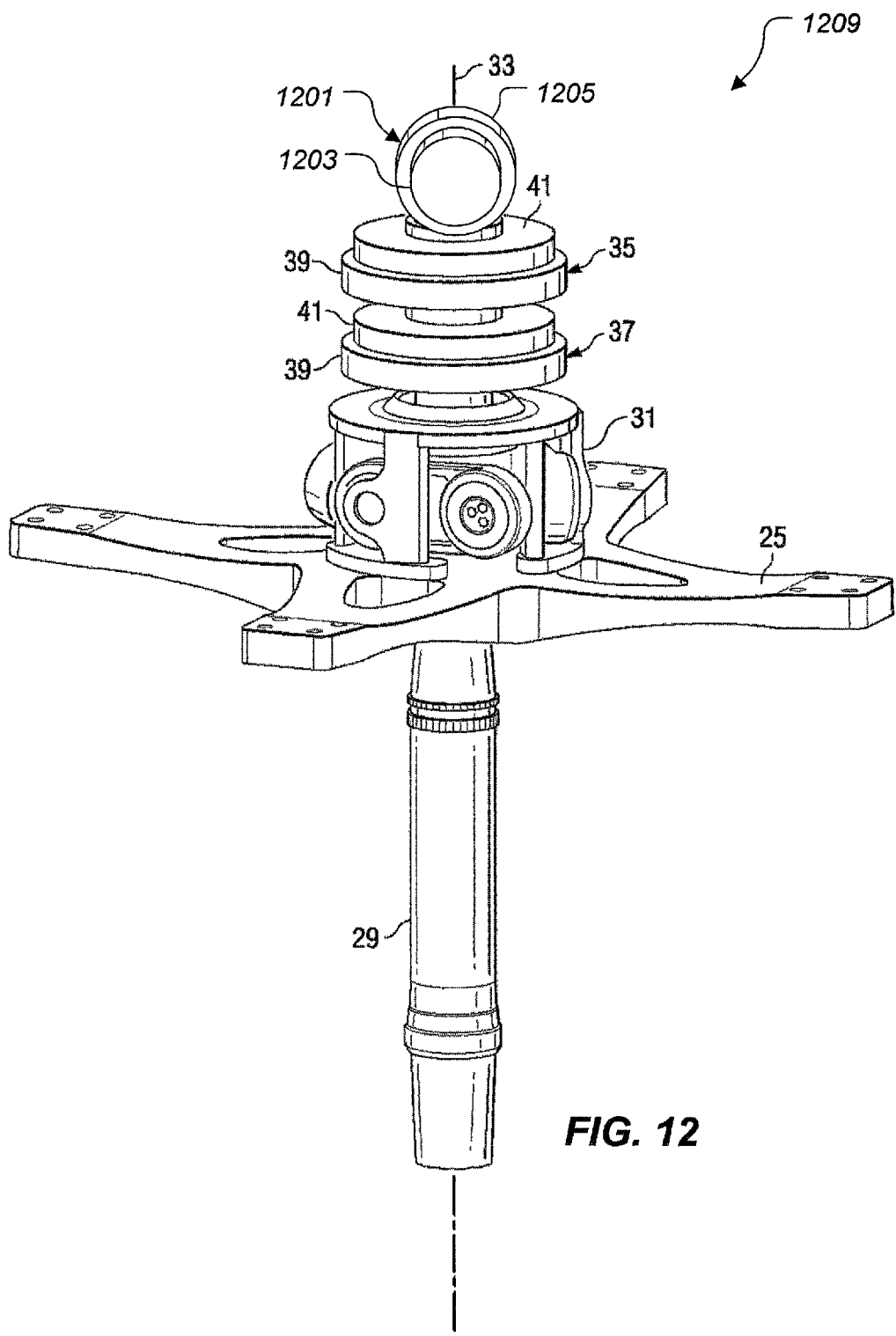
FIG. 12 is an oblique, partially sectioned view of a proprotor having an alternative embodiment of a vibration attenuation system.

FIG. 12 illustrates a portion of an embodiment of a proprotor 1209, which is constructed similarly to proprotor 19 of FIGS. 1 and 2, except for the addition of attenuator 1201 to treat vibration along axis 33 of mast 29. Proprotor 1209 has a yoke 25 attached to a drive assembly 31, and drive assembly 31 transfers torque from mast 29 to yoke 25. A spinner (shown in FIGS. 1 and 2) is installed as an aerodynamic fairing for the hub of proprotor 1209. Proprotor 1209 differs from proprotor 19, in that proprotor 1209 has a vibration attenuator 1201, which is coupled to standpipe 97 (shown in FIG. 13), and vertically aligned on mast axis 33 in order to selectively attenuate vibration axially along axis 33 of mast 29. As such, attenuator 1201 operates similar to attenuators 35, 37, except for being oriented vertically in line with axis 33 of mast 29. Therefore, the discussion herein regarding attenuators 35, 37 is equally applicable to the attenuator 1201, except for the attenuator 1201 oriented and configured to treat vertical vibrations instead of the rotor plane forces that attenuators 35, 37 are configured to cancel. Attenuator 1201 has a weighted disk 1205 and a stepper motor 1203. Attenuator 1201 may rotate the associated disk 1205 in either rotational direction. A control system, such as control system 43 of FIG. 1, is preferably provided for controlling the operation of disk 1205, including indexing and phasing of the disk, as described above for disks 39, 41. It should be appreciated that even though only one attenuator 1201 is shown, a plurality of attenuators 1201 may be used. In operation, having a plurality of attenuators 1201 allows for suppression of multiply vibrations simultaneously.

Figure 13:
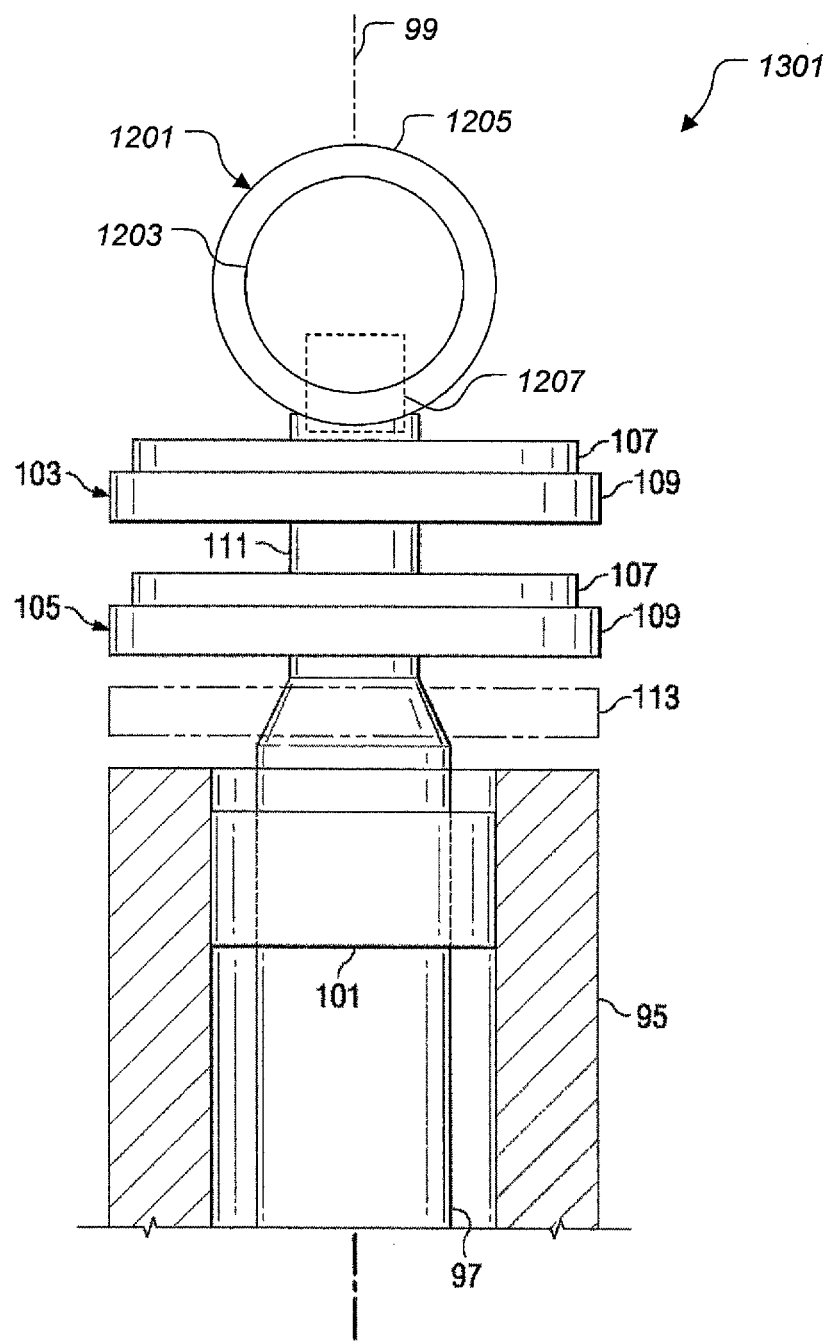
FIG. 13 is a side, partially sectioned view of a proprotor having an alternative embodiment of a vibration attenuation system.

Referring to FIG. 13, one embodiment of proprotor 1301 includes attenuators 103, 105 mounted to standpipe 97, in addition to attenuator 1201 (also shown in FIG. 12) mounted to standpipe 97 via a support 1207. Mast 95 rotates relative to the airframe (not shown) about axis 99 for rotating an attached proprotor (not shown). Standpipe 97 is stationary relative to the airframe, and bearings 101 are located between an outer surface of standpipe 97 and an inner surface of mast 95 to allow for the relative motion of mast 95 relative to standpipe 97. In the embodiment shown, two attenuators 103, 105 each comprise a motor 107 and a weighted disk 109. Attenuators 103, 105 are mounted to a narrowed section 111 at an outer end of standpipe 97. An optional platform 113 may be provided on standpipe 97 for mounting attenuators 103, 105 or other embodiments of the attenuators described above. In operation, motors 107 rotate disks 109 attenuators 103, 105 in a similar manned as those described herein regarding attenuators 35 and 37, such that attenuators 103, 105 to produce oscillatory shear forces on standpipe 97. These shear forces are then transferred into mast 95 through bearings 101. It should be noted that more or fewer attenuators than is shown may be mounted on standpipe 97. It should also be noted that a standpipe configuration is particularly useful with the gear-type drive system described above.

Figure 14:
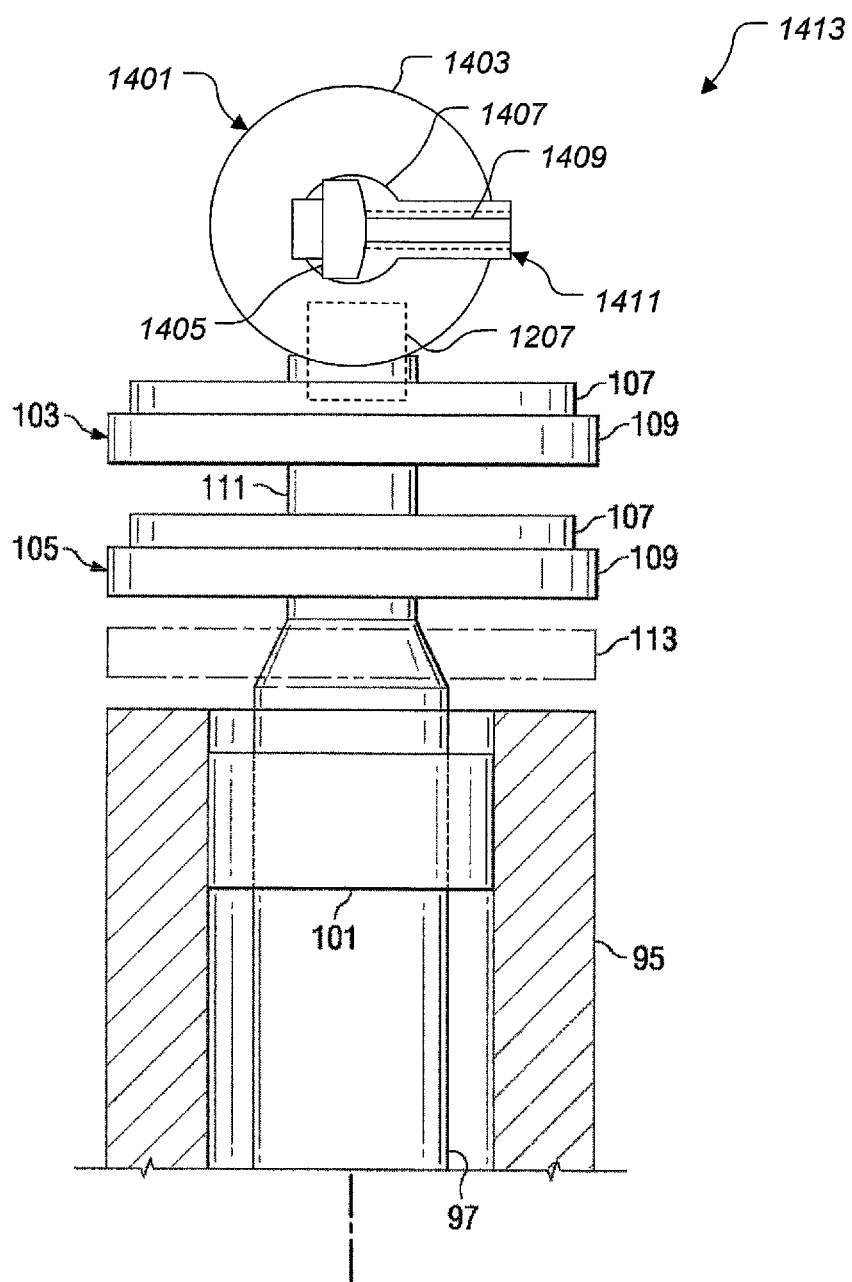
FIG. 14 is a side, partially sectioned view of a proprotor having an alternative embodiment of a vibration attenuation system.

FIG. 14 illustrates another embodiment of a proprotor 1413, which is constructed similarly to proprotor 65 of FIGS. 7 and 8, with the addition of attenuator 1401. As such, the discussion herein regarding attenuators 103 and 105 is equally applicable to proprotor 1413. Proprotor 1413 has a yoke 25 attached to a drive assembly 31, and drive assembly 31 transfers torque from mast 29 to yoke 25 for rotation of proprotor 65 about mast axis 33. A spinner 23 (shown in FIGS. 7 and 8) is installed as an aerodynamic fairing for the hub of proprotor 1413. Proprotor 1413 has a vibration attenuator 1401, comprising an adjustable weight assembly 1411, which is configured to be driven in rotation by stepper motor 1403. Weight assembly 1411 has at least one weight 1405 that is movably attached to weight support 1407 for positioning along track 1409 during operation of proprotor 1413. This configuration allows for weight 1405 to be selectively moved to any position between an inner radial position, which provides for minimal or no vertical forces as weight assembly 1411 spins, and an outer position, which provides for maximum vertical forces. A control system, such as control system 43 of FIG. 1, is preferably provided for controlling the parameters of operation of vibration attenuator 1401, including positioning of weight 1405, speed of rotation, direction of rotation, and phasing of the vertical forces relative to the position of the rotor.

In operation, control system 43 commands motor 1403 of vibration attenuator 1401 to rotate weight assembly 1411 at a selected rotational speed and direction relative to standpipe 97, and control system 43 also commands weight 1405 to move to a selected position along track 1409 for producing a selected amount of vertical force. In addition, control system 43 will command motor 1403 to rotate weight assembly 1411 in a manner that produces a selected phasing of the vertical forces relative to proprotor 1413.

Referring again to FIGS. 12-14, the vibration attenuators 1201 and 1401 are coupled to the standpipe 97 and configured to produce vertical forces along the axis of the standpipe 97. The vertical forces are generated by rotating one or more unbalanced weights to create an oscillatory force to cancel rotor induced vibrations along the axis of the standpipe. For example, rotor induced vibrations that can be canceled with vibration attenuators 1201 and 1401 include lift force vibrations that would otherwise travel down the rotor mast and into the rotorcraft fuselage. Because vibration attenuators 1201 and 1401 are mounted on standpipe 97, while the rotor induced forces travel into mast 95, bearing 101 can be configured so that the two sets of forces cancel in bearing 101. Alternately, the two sets of forces can cancel at adjoining structure near the base of the mast 95 and standpipe 97.

It should be appreciated that proprotors 1209 and 1301 may be alternatively configured to include one or more vertically oriented vibration attenuators 1201, without including attenuators 35 or 37. Similarly, proprotor 1413 may be alternatively configured to include one or more vertically oriented vibration attenuators 1401, without including attenuators 130 and 105.

The vibration attenuator provides for several advantages, including: (1) improved capability of vibration attenuation; (2) attenuation of vibration at the mast, instead of at the airframe; (3) improved control of the vibration attenuators; (4) reduced weight; and (5) improved reliability.

This description includes reference to illustrative embodiments, but it is not intended to be construed in a limiting sense. Various modifications and combinations of the illustrative embodiments, as well as other embodiments, will be apparent to persons skilled in the art upon reference to the description. For example, embodiments of vibration attenuators are shown installed on four-blade tiltrotor proprotors, though embodiments of vibration attenuators may be used on a tiltrotor proprotor having any number of blades and any other type of rotor, such as a helicopter rotor or aircraft propeller. In addition, embodiments are described herein as having stepper-type motors, though other appropriate types of motors may be used.

The invention claimed is:

1. A vibration attenuator for a rotor hub of an aircraft, the vibration attenuator comprising:
    a weight adapted to be mounted to a non-rotating member of the rotor hub of the aircraft, each weight also being adapted to be rotatable about a weight axis of rotation which is perpendicular to a rotor mast axis, wherein the weight is selectively movable for changing a distance between a center of mass of the weight and the weight axis of rotation; and
    a motor configured to rotate the weight about the axis of rotation at a selected speed during operation;
    wherein during operation the weight is driven in rotation for creating oscillatory vertical forces along the rotor mast axis for attenuation of rotor-induced vibrations having a selected frequency; and
    wherein the non-rotating member is stationary relative to an airframe of the aircraft.

2. The vibration attenuator according to claim 1, wherein the weight is generally disk-shaped and has a center of mass located a selected distance from the weight axis of rotation.

3. The vibration attenuator according to claim 1, wherein the non-rotating member is a standpipe.

4. The vibration attenuator according to claim 1, wherein the weight comprises at least one set of two weights; and
    wherein the weights in each set are rotated about the weight axis of rotation in the same direction during operation.

5. The vibration attenuator according to claim 1, wherein the weight comprises at least one set of two weights; and
    wherein during operation the weights of each set may be rotated about the axis of rotation at a different rotational speed than the weights of another set, allowing attenuation of vibrations at multiple frequencies.

6. The vibration attenuator according to claim 1, wherein the weight comprises at least one set of two weights; and
    wherein during operation the weights of one set may be rotated about the weight axis of rotation in a direction different than the direction of rotation of the weights of another set.

7. The vibration attenuator according to claim 1, wherein the weight comprises at least one set of two weights; and
    wherein during operation the weights of each set may be angularly positioned about the axis of rotation relative to each other so as to produce no net force.

8. The vibration attenuator according to claim 1, wherein the motor is an electric motor.

9. The vibration attenuator according to claim 1, wherein the motor is adapted for transferring torque to the weight for rotating the weight during operation.

10. The vibration attenuator according to claim 1, wherein the motor is coupled to the non-rotating member of the rotor hub with a support.

11. The vibration attenuator according to claim 1, wherein the non-rotating member is supported in part by a bearing between the non-rotating member and a rotating rotor mast.

12. The vibration attenuator according to claim 1, wherein the weight includes a translatable weight that is configured to be selectively translated on a track that extends radially from the weight axis of rotation.

13. The vibration attenuator according to claim 1, wherein the weight comprises at least one set of two weights; and
    wherein the each set of weights may be rotated about the weight axis of rotation in a manner that produces a selected phasing of the oscillatory vertical forces.

14. A method of attenuating vibrations in an aircraft having at least one rotor having blades, the rotor having a rotor hub configured for being driven in rotation by a mast about a mast axis of rotation, the method comprising:
    (a) locating a rotatable weight in the rotor hub;
    (b) rotating each weight at a selected speed about a weight rotation axis that is approximately perpendicular to the mast axis of rotation, the weight being associated with a non-rotating member of the rotor hub, the non-rotating member is stationary relative to the mast, and positioning the weight for controlling a distance between a center of mass of the weight and the weight rotation axis; and
    (c) controlling the rotation of the rotatable weight for creating oscillatory vertical forces that oppose rotor-induced vibrations having a selected frequency.

15. The method according to claim 14, further comprising:
    (d) controlling the rotation of the rotatable weight in manner that selectively phases the oscillatory vertical forces relative to the rotor hub.

16. The method according to claim 14, wherein step (b) comprises rotating the weight at a speed that is a multiple of the product of the number of blades of the rotor multiplied by the rotational speed of the rotor.

* * * * *